United States Patent [19]

Razzano

[11] 4,028,338

[45] June 7, 1977

[54] FLUOROSILOXYDIPHENYLSILOXY BLOCK COPOLYMERS

[75] Inventor: John S. Razzano, Watervliet, N.Y.

[73] Assignee: General Electric Company, Waterford, N.Y.

[22] Filed: Oct. 9, 1975

[21] Appl. No.: 621,032

[52] U.S. Cl. .................. 260/46.5 R; 260/448.2 R; 260/825

[51] Int. Cl.² ........................ C08G 77/04

[58] Field of Search ........ 260/46.5 R, 825, 448.2 R

[56] References Cited

UNITED STATES PATENTS 3,337,497  8/1967  Bostick ........................ 260/37 SB
3,503,926  3/1970  Saylor ............................... 260/46.5

Primary Examiner—Melvyn I. Marquis
Attorney, Agent, or Firm—John L. Young; E. Philip Koltos; Frank L. Neuhauser

[57] ABSTRACT

There is provided by the present invention a solvent resistant block copolymer having desirable processability comprising a copolymer of the formula,

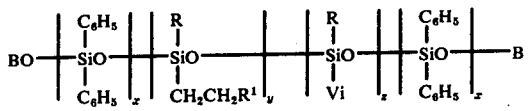

where R is an alkyl radical of 1 to 3 carbon atoms, $R^1$ is a perfluoroalkyl radical of 1 to 8 carbon atoms, Vi is vinyl, B is selected from the class consisting of lithium and hydrogen, $x$ varies from 20 to 400 and $y$ varies from 700 to 6000 and $z$ varies from 0 to 100.

There is also provided by the present invention an advantageous process for producing the above block copolymer.

3 Claims, No Drawings

FLUOROSILOXYDIPHENYLSILOXY BLOCK COPOLYMERS

BACKGROUND OF THE INVENTION

The present invention relates to a block copolymer having excellent solvent resistance, as well as desirable processability and more particularly the present invention relates to a block copolymer composed of alkylperfluoroalkylethylenesiloxy blocks and diphenylsiloxy blocks which block copolymer has desirable processability properties and excellent solvent resistance.

Dimethylpolysiloxane polymers which are cured with peroxide curing catalysts to produce heat vulcanizable silicone rubber elastomers are well known in the art. Such heat vulcanizable elastomers have the desired low and high temperature stability that is well known of silicone elastomers. However, one difficulty in the production of such elastomers is that the diorganopolysiloxane gums that are utilized have viscosities of 1,000,000 to 200,000,000 centipoise at 25° C. Such materials with the incorporation of the necessary amounts of filler in them tend to be very viscous, as can be appreciated, and very tacky. Accordingly, such polymers are very difficult to process because of their tackiness on standard processing equipment in the preparation of such compositions prior to curing them at elevated temperatures.

There have been many attempts to alleviate the processing problems in the treating of such uncured heat vulcanizable silicone rubber compositions. One approach to the problem is to utilize process aids. Another approach is that disclosed in the foregoing Bostick, U.S. Pat. No. 3,337,497 which is to form a block copolymer having diphenylsiloxy blocks in the copolymer along with dimethylsiloxy blocks. The advantages of having such diphenylsiloxy blocks is that such blocks depending on the number of siloxy units in the block are crystalline at temperatures up to 200° C and above. Accordingly, they impart to the diorganopolysiloxane block copolymer a certain amount of stiffness which prevents the polymer from being tacky and accordingly facilitates the processing of heat vulcanizable silicone rubber compositions in the uncured state. However, such polymers while being processable in the uncured state do not have as high a solvent resistance in hydrocarbon fluids as would be desired.

Solvent resistant heat vulcanizable silicone rubber compositions having fluorinated substituent groups in the polymer are well known — see, for instance, U.S. Pat. No. 2,979,519 of Pierce et al and U.S. Pat. No. 3,179,619 of Brown.

However, one disadvantage of such polymers which are utilized to produce heat vulcanizable silicone rubber compositions, such as that disclosed in the above patents, is that fluorinated gums are even more tacky than dimethylpolysiloxane gums and thus are extremely difficult to process even at temperatures below room temperature. To alleviate this problem, certain process aids have been developed for fluorosilicone polymers. However, these process aids have not completely alleviated the problem. Further, the Bostick, U.S. Pat. No. 3,337,497, specifically discloses that this block copolymer be free of halogen hydrocarbon substituent groups. Accordingly, little, if any, attempt has been made up to the present time to produce such block copolymers with fluorinated substituent groups.

It is one object of the present invention to produce a solvent resistant block copolymer having desirable processability properties in the uncured state.

It is another object of the present invention to provide a solvent resistant block copolymer composed of diphenylsiloxy blocks and alkylperfluoroalkylethylenesiloxy blocks.

It is an additional object of the present invention to provide an economical process for producing solvent resistant block copolymers with excellent processability properties wherein the block copolymer is composed of diphenylsiloxy blocks and alkylperfluoroalkylethylenesiloxy blocks.

It is yet an additional object of the present invention to provide a process for producing high yields of a solvent resistant block copolymer having desirable processability properties.

It is still an additional object of the present invention to provide a heat vulcanizable silicone rubber composition having as the main polymer a block copolymer composed of diphenylsiloxy blocks and alkylperfluoroalkylethylenesiloxy blocks wherein the cured elastomer that is formed from the composition has excellent solvent resistance.

These and other objects of the present invention are satisfied by means of the disclosure set forth herein below.

SUMMARY OF THE INVENTION

In accordance with the above objects, there is provided by the present invention a solvent resistant block copolymer having excellent processability properties in the uncured state comprising a copolymer of the formula,

where R is an alkyl radical of 1 to 3 carbon atoms, $R^1$ is a perfluoroalkyl radical of 1 to 8 carbon atoms, Vi is vinyl, B selected from the class consisting of lithium and hydrogen, $x$ varies from 20 to 400, $y$ varies from 700 to 6000 and $z$ varies from 0 to 100. The above block copolymer is produced by reacting in the anhydrous state a trimer of the formula, $$[ (R) (R^1CH_2CH_2) SiO ]_3 \qquad (2)$$

in the desired molar proportions in the presence of a solvent promoter selected from the class consisting of tetrahydrofuran, dioxane, dimethylformamide, dimethylsulfoxide, tetramethyl urea and a catalyst which is a dilithium compound and then after the fluorinated block is formed to add a trimer of the formula, $$[ (C_6H_5)_2 SiO ]_3 \qquad (3)$$

and complete the reaction.

At this point, there may optionally be added along with the fluorinated trimer a methylvinyl trimer to add various amounts of methylvinylsiloxy units in the fluorinated block to facilitate the curing of the final block copolymer with a peroxide catalyst.

In the preferred embodiment, the reaction is carried out in two stages where in the first stage the reactants are heated at a temperature of 55° to 85° C for a period of time varying from 0.5 to 4 hours and in the second reaction period the solvent promoter is stripped off and there is added to the reactants the diphenyl trimer in a high boiling solvent and the reaction is completed at a temperature varying anywhere between 85° to 180° C for an additional period of time varying from 1 to 8 hours. The high boiling solvent may be such solvents as dichlorobenzene, and the dimethoxyether of ethylene glycol and diphenylether. When the reaction is completed the dilithium compound is neutralized with any well known neutralizing agent from lithium but is preferably neutralized with compounds such as water, acetic acid, or an aliphatic alcohol. The solvent promoter or high boiling solvent is then stripped off to yield the block copolymer. The catalyst is utilized at a concentration of 0.7 to 8.0 millimoles per mole of trimer reactants and more preferably utilized at a concentration of 1.1 to 6.0 millimoles per mole of trimer reactants. Further, it is only necessary that the solvent promoter be in sufficient quantities in the initial part of the reaction so as to dissolve the trimer reactants and more preferably it is utilized in considerable excess since it facilitates the promotion of the reaction. As can be understood in the reaction, the fluorinated trimer is first added to the solvent promoter in the presence of a catalyst and allowed to react to form a fluorinated block and then the diphenylsiloxy trimer is added to form the terminal blocks on the block copolymer.

Once the block copolymer is prepared it may then be taken and mixed with the well known ingredients utilized in heat vulcanizable silicone rubber compositions to produce a solvent resistant elastomer. With the diphenylsiloxy blocks in the block copolymer, the polymer with the filler mixed in and any process aids, pigments, flame retardants and other additives has stiffening properties in the composition such that it is not very tacky. Thus, the entire uncured composition has good processability properties.

DESCRIPTION OF THE PREFERRED EMBODIMENT

In formula (1) of the block copolymer, R may be any alkyl radical of 1 to 3 carbon atoms but it is most preferably methyl; $R^1$ is a perfluoroalkyl radical of 1 to 8 carbon atoms and is preferably $CF_3$; $x$ varies from 20 to 400 as indicated above but preferably varies from 100 to 200. Generally, the two diphenylsiloxy blocks are approximately of the same siloxy unit length. It is only necessary that the diphenylsiloxy block be at least 20 units long to give the block copolymer the proper crystallinity, specifically, to give the block the desired crystallinity up to a temperature of 283° C, which is the temperature at which the fluorosilicone may degrade due to heat.

Within the above ranges for $y$, as indicated, $y$ may vary from 700 to 6,000 but preferably varies from 1,000 to 2,500; B in the above formula may be lithium or is preferably hydrogen as a result of the neutralization of the catalyst during the process of producing the block copolymer.

It should be noted at this instance that the presence of the hydroxy groups at the end of the block copolymer do not create a problem when the material is used to produce heat vulcanizable silicone rubber compositions since such hydroxy groups are present at a very small weight percent. Normally, the block copolymers of the instant invention as prepared with the foregoing process will have a viscosity of 10,000,000 to 200,000,000 centipoise at 25° C.

The presence of the perfluoroethylenesiloxy units imparts to the block copolymer the proper solvent resistance and the diphenylsiloxy units because they maintain their crystalline form up to temperatures of 283° C and imparts a stiffening effect to the block copolymer such that it facilitates the processing of the block copolymer.

The process for producing the present block copolymer is simple and economical but it must be followed carefully if a high yield of the present block copolymer is to be obtained.

Accordingly, the basic reaction for producing the block copolymer of the present case comprises taking a tricyclicsiloxane of formula (2), where R and $R^1$ are as previously defined and dissolve in it an excess of a solvent promoter. The solvent promoter is critical to the present invention and is preferably selected from the class consisting of tetrahydrofuran, dioxane, dimethylformamide, dimethylsulfoxide, trimethyl urea, and compounds of an equivalent solvent promoter nature. Optionally, at this point there may be added minor amounts of a trimethyltrivinylcyclictrisiloxane so as to introduce methylvinylsiloxy units in the polymer to facilitate the curing of the final polymer with a peroxide to produce a heat cured elastomer. Preferably, sufficient cyclictrisiloxane is added so that $z$ can vary from 1 to 100. It must be understood that insofar as such methylvinylsiloxy units are concerned they may be interspersed with the fluorinated siloxy blocks or from a separate block depending on whether the vinyl trimer is added after the block is formed or concurrently with the addition of the fluorinated trimer to reaction vessel. To this mixture there is added the necessary catalyst which can be any dilithium compound and is specifically a dilithium aromatic containing compound. Specific types of dilithium compounds which can be utilized as catalysts in the present invention are compounds of the formula,

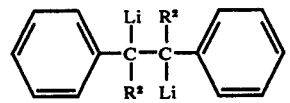 (4)

and compounds of the formula,

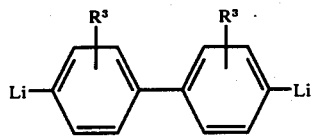 (5)

where $R^2$ and $R^3$ are selected from hydrogen and lower alkyl radicals of 1 to 8 carbon atoms and are preferably hydrogen, or methyl.

The reaction solution composed of the fluorinated tricyclicsiloxane, solvent promoter and catalyst are then preferably heated at the reflux temperature of the solvent promoter which is generally in the range of 55° C to 85° C. This reaction temperature range is not critical. The elevated temperature above room temperature desirably promotes the reaction and higher temperatures could be utilized, however, some of the solvent promoters specified above do have a reflux temperature above the range indicated above and it is necessary initially that the temperature not exceed 85° C. With these ingredients and the heating of the mixture the fluorosilicone block is built up. The amount of trimer that is utilized is controlled by the amount of alkylperfluoroalkylethylenesiloxy units it is desired to have in the basic block in the block copolymer. This reaction is usually carried out generally anywhere from 0.5 to 4 hours. Usually a reaction time of from 0.5 to 1 hour is sufficient for the formation of an alkylperfluoroalkylethylenesiloxy block of the desired size. At the end of that time there is then added to the reaction mixture a diphenylsiloxycyclictrisiloxane of formula (3) and the reaction is allowed to proceed in the above temperature range until the diphenylsiloxy blocks have been built up to form the block copolymer of formula (1) above. This generally takes place at an additional reaction time of anywhere from 1 to 8 hours.

It must be appreciated that during the reaction the whole system must be maintained as free of water as possible, that is, in an anhydrous state. The presence of even appreciable amounts of water will poison and neutralize the catalyst that is used as a chain propagator in the above-described process.

It must also be appreciated that only cyclictrisiloxanes should be utilized in the present reaction since they result in a high yield of polymer, that is, a yield of block copolymer in the 90 to 100% area from the above reactants. Other cyclicsiloxanes will produce a much lower yield of the desired block copolymer or will not react at all under the described conditions.

Again, the amount of diphenylcyclictrisiloxanes that are utilized in the reaction mixture will depend and is controlled by the amount or the size of the diphenylsiloxy blocks that is desired. The dilithium compound catalyst concentration may vary anywhere from 0.02 to 4.0 millimoles per mole of trimer reactants and preferably varies from 0.04 to 3.0 millimoles per mole of trimer reactants. Too little dilithium compound catalyst will not act as sufficiently as a chain propagator for the siloxy blocks to be formed and too much dilithium catalyst will result in side reactions and the formation of other copolymers other than the desired block copolymers and will result in low viscosity copolymer. After the reaction time has terminated then there may be added a neutralizing agent to the reaction solution to neutralize the lithium chain propagator ions in the block copolymer that is formed.

Such neutralizing agents may be any well known neutralizing agents for lithium ions and are most desirably acetic acid, water or aliphatic alcohols. After the utilization of the catalyst the solvent promoter may be distilled off to yield the desired ordered block copolymer of formula (1) having a viscosity of anywhere from 10,000,000 to 200,000,000 centipoise at 25° C. As such, the block copolymer will generally have anywhere from a 5 to 40 mole percent diphenylsiloxy content with the rest of the substituent groups being alkylperfluoroalkylethylenesiloxy units to give the copolymer the proper solvent resistance.

To carry out the process in two steps, the initial part of the process is carried out as described above, that is, with one of the solvent promoters indicated above, by carrying out the initial part of the reaction to form the alkylperfluoroalkylethylenesiloxy blocks by heating the reaction mixture at a temperature of 55° to 85° C for 0.5 to 4 hours. At the end of that period and after the fluorinated siloxy block has been formed, it is preferred to utilize a higher boiling solvent, that is, a solvent having a reflux temperature of anywhere from 85° to 180° C. Examples of such solvents being dichlorobenzene and the dimethoxy ether of ethylene glycol and diphenyl ether. The second solvent may be added to the reaction mixture with the diphenyl trimer of formula (3) and the solvent promoter is stripped off. The reaction mixture is then heated at temperatures of anywhere between 85° to 180° C or as high as possible within that temperature range guided by the reflux temperature of the higher boiling solvent for a period of time of anywhere from 1 to 8 hours to complete the polymerization. The amounts of the higher boiling solvent that is utilized is generally within the same range as the initial solvent promoter. Both solvents are utilized in sufficient quantities to dissolve the reactant trimers and preferably are present in excess since this tends to accelerate the reaction of the formation of the block copolymer.

The advantage of using a high boiling solvent in the second reaction period is that it facilitates the formation of an ordered diphenylsiloxy block. Although desired block copolymers are formed without this two solvent procedure, the diphenylsiloxy blocks are formed in a faster period of time when the higher boiling solvent is utilized in the second step of the reaction.

Finally, the reaction is terminated as previously stated by neutralization of the dilithium compound and then stripping off the higher boiling solvent to yield the desired ordered block copolymer of formula (1) of the present invention.

The block copolymer of the present case can be utilized in well known procedures to produce heat vulcanizable silicone rubber compositions. Thus, the block copolymer may be mixed with the appropriate amounts of reinforcing or extended fillers. Examples of reinforcing fillers are fumed silica and precipitated silica which may be untreated or treated with cyclicsiloxanes, silazanes or other well known filler treating agents. Or there may be incorporated into it an extending filler alone or with the reinforcing filler. Examples of such extending fillers being diatomaceous earth, lithopone and etc. Well known process aids for heat vulcanizable silicone rubber compositions can be utilized with the present block copolymers. In addition, flame retardant agents such as, platinum, etc.; heat stabilizing additives such as, iron oxide; compression set additives, as well as other well known additives for heat vulcanizable silicone rubber compositions can all be added to the uncured composition. The composition is then cured by incorporating into it the desired amounts of well known peroxide curing agents. Examples of such peroxide curing agents are dicumyl peroxide and benzoyl peroxide. The resulting mixture is then taken and formed into the necessary fabricated part that it is desired to utilize the composition and cured at elevated temperatures which may be in the range of anywhere from 100° to 300° C to produce a silicone elastomer with excellent solvent resistance.

As an example of the general preparation of such heat vulcanizable silicone rubber compositions in which the present ordered block copolymer may be utilized in — see, for instance, the patent of DeZuba et al, U.S. Pat. No. 3,896,123, which patent is hereby incorporated into the present case by reference.

The following examples are given for the purpose of illustrating the present invention but are not intended to define the limits or scope of the present ordered block copolymers and the process for making them. All parts in the present specification are by weight.

EXAMPLE 1

To dry tetrahydrofuran there is added 4 moles of anhydrous 3,3,3-trifluoropropylmethylcyclictrisiloxane, the tetrahydrofuran being utilized in great excess to completely dissolve the fluorinated cyclicsiloxanes. The resulting mixture is then heated to 55° C and 1.25 millimoles of dilithio stilbene catalyst is then added. After a period of 3 hours there is formed fluorosiloxy blocks of about 2000 siloxy units long. To this mixture there is then added an anhydrous solution of 1 mole of hexaphenylcyclotrisiloxane dissolved in tetrahydrofuran where there is sufficient tetrahydrofuran to completely dissolve the cyclictrisiloxane. The reaction mixture is then allowed to react for 2 hours at 55° C. At the end of this period, the tetrahydrofuran is stripped slowly off from the reaction mixture in a period of time of about 1 hour. At the end of this time the batch temperature was 85° C, but some tetrahydrofuran was still refluxing. After two hours under these conditions, the remaining tetrahydrofuran was stripped from the reaction. Then 2 drops of acetic acid are added to deactivate the catalyst. For the purpose of determining the structure of the polymer, the polymer is swelled in ethyl acetate and precipitated from ethyl acetate into methanol. No unreacted diphenyl trimer was found. The block copolymer that is formed was white in color and has the following formula,

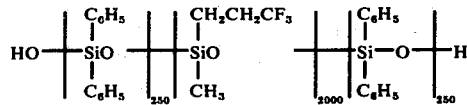

This copolymer had a concentration of 80 mole percent of methyltrifluoropropylsiloxy units. For comparision purposes a random block copolymer is formed. Thus, there is reacted in a typical solvent, toluene, 0.8 moles of

with 0.2 moles of pure diphenylsilane diol at a 160° C temperature using 800 ppm of stannous octoate catalyst for a period of time varying from 1 to 4 hours. Utilizing this procedure there is formed a clear random copolymer which had a concentration of 80 mole percent of methyltrifluoropropylsiloxy units.

The ordered block copolymer of the formula above and the random block copolymer of the formula above are then taken and per 100 parts of the polymer there is added to each polymer 40 parts of octamethylcyclic-tetrasiloxane treated fumed silica and 3 parts of benzoyl powder and the resulting mixture is then cured for 20 minutes at 300° F. The samples are cooled in the mold and then post cured for 1 hour at 400° F. The solvent swell for each rubber sample is then measured in toluene at room temperature for 24 hours. The results of the solvent swell test is as follows:

| Sample | V% Solvent Swell |
| --- | --- |
| Block copolymer | 39 |
| Random copolymer | 139 |

The above data indicates that for substantially the same methyltrifluoropropylsiloxy content the ordered block copolymer of the present case has substantially superior solvent resistance to hydrocarbon fluids. In addition, the uncured polymer is found to be considerably easier to handle and mix with the other ingredients than the random copolymer which did not have in it diphenylsiloxy crystalline blocks in the copolymer.

EXAMPLE 2

In an anhydrous system and to an excess of tetrahydrofuran there is added 5 moles of anhydrous 3,3,3-trifluoropropylmethylcyclictrisiloxane and 2.41 millimoles of dilithiostilbene dissolved in tetrahydrofuran is added. The resulting mixture is heated to reflux at 55° C for a period of time of about 3 hours. At the end of that time it is found that the dilithio fluorinated terminated block has 1000 siloxy units in it. Then there is added to the mixture an anhydrous solution of 1½ moles of hexaphenylcyclotrisiloxane dissolved in an excess amount of dichlorobenzene. The resulting mixture is then heated at 95° C to strip off the tetrahydrofuran and then heated at a temperature of 150° C for 3 hours. At the end of that time, the dichlorobenzene is stripped off in about ½ hour and 2 drops of acetic acid is added to deactivate the polymer. The ordered block copolymer that is formed has the structural formula,

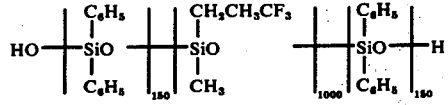

I claim:
1. A solvent resistant block copolymer having desirable processability comprising a copolymer of the formula,

where R is an alkyl radical of 1 to 3 carbon atoms, $R^1$ is a perfluoroalkyl radical of 1 to 8 carbon atoms, Vi is vinyl, B is selected from the class consisting of lithium and hydrogen, $z$ varies from 0 to 100, $x$ varies from 20 to 400 and $y$ varies from 700 to 6000.

2. The copolymer of claim 1 wherein R is methyl and $R^1$ is $CF_3$ and B is hydrogen.

3. The copolymer of claim 1 wherein $x$ varies from 100 to 200 and $y$ varies from 1000 to 2500.

* * * * *